United States Patent [19]

Robinson

[11] 4,355,943
[45] Oct. 26, 1982

[54] VEHICLE GATE LIFT WITH PROTECTION AGAINST OPERATION WITH IMPROPER LOADS

[76] Inventor: Morris D. Robinson, 179 Via Los Miradores, Redondo Beach, Calif. 90277

[21] Appl. No.: 188,241

[22] Filed: Sep. 17, 1980

[51] Int. Cl.³ .............................................. B60P 1/48
[52] U.S. Cl. ...................................... 414/557; 91/452
[58] Field of Search .................. 91/451, 452; 414/545, 414/557

[56] References Cited

U.S. PATENT DOCUMENTS

| | | | |
|---|---|---|---|
| 2,593,240 | 4/1952 | Anthony | 414/557 |
| 2,654,491 | 10/1953 | Duis | 414/557 |
| 2,848,122 | 8/1958 | Gwinn | 414/557 |
| 4,111,317 | 9/1978 | Robinson | 414/680 |

FOREIGN PATENT DOCUMENTS

| | | | |
|---|---|---|---|
| 2630856 | 3/1977 | Fed. Rep. of Germany | 414/557 |
| 55-19690 | 2/1980 | Japan | 91/452 |
| 964042 | 7/1964 | United Kingdom | 91/452 |

Primary Examiner—Robert G. Nilson
Attorney, Agent, or Firm—Donald D. Mon

[57] ABSTRACT

Actuator and control circuits for tailgate lifts of the type which lift and lower loads in a lifting mode and which fold in a folding (closing) mode. Control circuitry is provided which minimizes the risk of inadvertent folding of the gate when loaded. The circuitry can also be adapted to limit the lifting capacity of the actuator to the lifting of a safe load.

8 Claims, 2 Drawing Figures

VEHICLE GATE LIFT WITH PROTECTION AGAINST OPERATION WITH IMPROPER LOADS

FIELD OF THE INVENTION

This invention relates to tailgate lifts, and especially to actuators and control means to help protect such lifts against inadvertent closing of the platform when loaded.

BACKGROUND OF THE INVENTION

Tailgate lifts are widely known, one example being shown in Robinson U.S. Pat. No. 4,111,317 issued Sept. 5, 1978. It is a function of such a lift that in a lifting mode it can be run up and down so as to lift and to lower a load. Also, when it is near its upper position the actuator can be enabled to continue to operate so as to fold the gate in a folding mode so as to tilt up against the rear of the truck.

It is an object of this invention to provide an operative system to prevent the inadvertent folding of the platform when a load such as a person is on it because that load might be trapped between the truck and the folded platform or fall from the platform and thereby cause damage or injury.

It is an optional object of the invention to prevent operation of the actuator in the lifting mode when an excessive load is on the platform.

BRIEF DESCRIPTION OF THE INVENTION

This invention is carried out in combination with a tailgate lift of the type which includes a platform that is adapted to be raised and lowered in a lifting mode while substantially level, and which near its upper limit is enabled to be tilted so as to open and close in a folding mode, by actuation of a hydraulic actuator. The actuator comprises a piston-cylinder combination having a power chamber at one side of the piston, and a supply port providing access to the power chamber. A hydraulic sump is provided, and a source of hydraulic fluid withdraws fluid from the sump and places it under pressure. A supply conduit connects the source to the supply port. A return conduit connects the supply port to the sump. A first open-closed selector valve is plumbed in the return conduit, and is adapted selectively to enable and to prevent flow of hydraulic fluid from the supply port to the sump. A first relief valve and an optional second relief valve are provided, the relief valves being individually plumbed to the supply conduit and being individually set to relief pressure settings to relieve pressure in the supply conduit at a respective pressure, thereby limiting the force which can be exerted by the actuator. The relief valves discharge fluid to the sump at the respective relief pressures. A second open-closed selector valve is interconnected between the supply conduit and the first relief valve, said second selector valve being adapted selectively to enable and to prevent flow from the supply conduit to the first relief valve. A mechanical selector is provided for causing platform folding mechanism to fold the platform upon the actuation of said actuator while the platform is near its uppermost position, the mechanical selector being connected to said selector valve whereby to enable passage of fluid from the supply conduit through the first relief valve when the platform is to be folded, whereby to prevent folding of the platform when there is a weight on it. When provided, the second selector valve limits the load which can be lifted on the platform.

The above and other features of this invention will be fully understood from the detailed description and the accompanying drawings, in which:

DETAILED DESCRIPTION OF THE INVENTION

Figure 2:
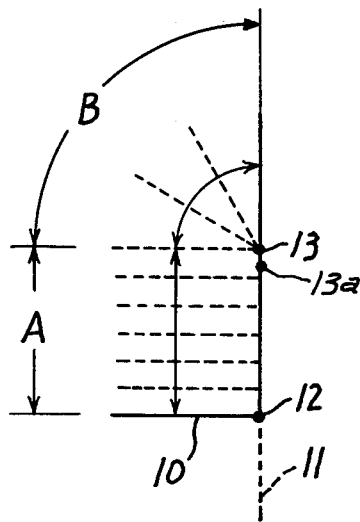
FIG. 2 is a schematic showing of the lifting and folding modes of the platform.

As best shown in FIG. 2, a platform 10 for a tailgate lift is adapted to move along a generally vertical axis 11 on the rear of truck (not shown). Persons desiring to have specific details of the attachment of a tailgate lift to a truck of this type may refer to Robinson U.S. Pat. No. 4,111,317, which is incorporated by reference herein for that purpose.

The lower range A is where the platform moves up and down in a lifting mode while horizontal. The horizontal lines indicate successive positions attainable in the vertically up and down movement of the platform while in its horizontal position. The forward edge of the platform in its lowermost position is shown at point 12 and the uppermost lifting position is shown by point 13. When the platform is to be tilted in the folding mode it starts to tilt near point 13a just below point 13 (described as "near" or at point 13) and terminates when folded with its forward edge at point 13, having traveled approximately in the positions shown in arc B.

It is an optional function of this invention that the total weight of the platform plus any load on it should not exceed a given weight in the lifting mode, and a required function that it should not exceed the weight of the platform in the folding mode. As an example, a six hundred pound platform might be designed to carry an eighteen hundred pound load in the lifting mode. Therefore, the actuator for actuating the device in the lifting mode should not be able to overcome a weight greater than 2,400 pounds. Similarly if the platform is not permitted to be folded with a load on it such as a person or an object, then the actuator should not, in the intial position, be able to exert a force greater than that required to tilt a 600 pound platform, with no load on it. Especially with piston-cylinder type actuators, this load limitation can readily be exerted simply by controlling the hydraulic pressure applied to the actuator. This is the basic mode of control of the invention.

Figure 1:
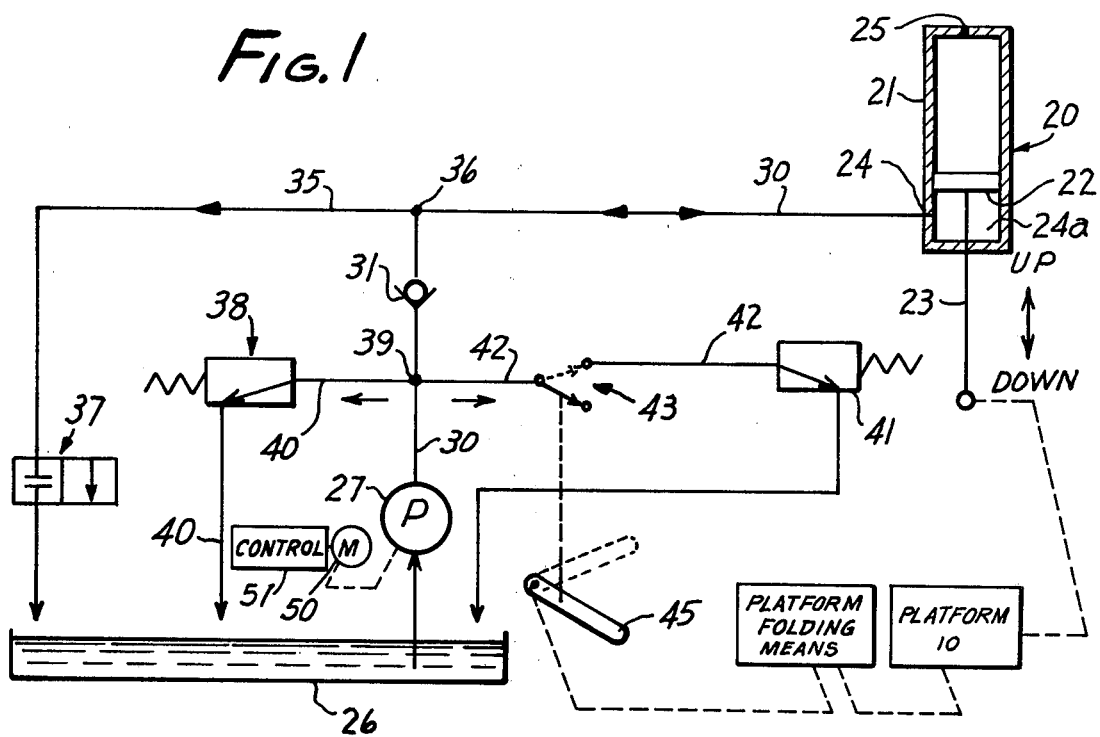
FIG. 1 is a schematic circuit drawing showing the control for an actuator according to the invention.

In FIG. 1 there is shown an actuator 20 in the nature of a piston-cylinder combination which includes a cylinder 21, a piston 22, and a rod 23, the rod being connected to the platform by means of appropriate linkage and rails. The cylinder includes a supply port 24 which gives access to a power chamber 24a in the cylinder on one side of the piston. The other side of the piston is appropriately vented by a vent port 25.

A sump 26 is provided from which a pump 27 withdraws hydraulic fluid, and thereby constitutes a force of hydraulic fluid under pressure. The pump may be actuated by a motor 50, and appropriate off-on switches and controls 51 will be provided.

A supply conduit 30 conveys hydraulic fluid under pressure to the power chamber of the actuator. It includes a unidirectional flow check valve 31 which permits flow only from the pump within a portion of the circuit yet to be described. A return conduit 35 branches from the supply conduit at point 36 to return to the sump through a first open-closed selector valve 37. When valve 37 is open it will drain the supply line at point 36, and will permit the piston to move down in FIG. 1, and the platform would then unfold and/or lower. When valve 37 is closed, the piston cannot move down and the platform cannot unfold or lower.

A second relief valve 38 is connected to supply conduit 30 at point 39, and is adapted to permit relief flow through relief conduit 40 at pressures at excess of its relief setting. A first relief valve 41 is connected to supply conduit also at point 39 and enables the flow of hydraulic fluid through relief conduit 42 at pressures at and above the relief setting of the first relief valve (which will be lower than the relief pressure of the second relief valve). A second open-closed selector valve 43 is plumbed in relief conduit 42. When open to flow it permits flow to the first relief valve, and when closed blocks flow therethrough. A selector handle 45 is mechanically connected to the selector valve 43 and is also mechanically connected to a cam selector (not shown). The cam mechanically determines whether or not the platform will be closed by operation of the actuator when the platform is in its uppermost position.

In operation, the pressure release setting of the second relief valve is selected at a pressure which will enable the actuator to exert only the desired maximum force to lift no more than the maximum designed weight of the platform. The relief setting of the first relief valve is selected at a lower value and will be set to permit the pressure supplied to the actuator to be no greater than that which will just close the platform without a load thereon. It will thereby be seen that when the selector handle is set to the non-folding (solid line) position, it is mechanically impossible for the platform to be folded and the second selector valve's relief pressure setting will limit the operation of the system. When the gate is to be folded, the handle will be turned to the folding (dashed-line) position, and the first relief valve's relief pressure will be controlling over the system because it is lower than that of the second relief valve.

The foregoing arrangement accounts for the upward and folding movements. The unfolding and lowering movements in the arrangement shown are caused by the weight of the platform itself exerted on the rod, which will pull it down. This will, of course be controlled by first selector valve 37 which if closed will prevent downward or unfolding movement. When the selector valve is open it will permit it to occur at a rate established by valve 37 or by some restrictor which may be in the circuit.

The relief pressures may be selective by a one-time selection of bias spring, or by an adjustably biased spring. The term "set" therefore includes, but is not limited to "adjustably set".

Persons skilled in the art will recognize that different hydraulic arrangements can be made including those which work on both sides of the piston, but that the system shown is elegant in its simplicity and of minimal expense. The maximum load to be carried in the two modes can readily be adjusted by changing the spring tension of the relief valves.

There has been provided in a simple hydraulic circuit an elegantly simple and reliable control which will prevent damage or injury to persons or objects by inadvertent folding of the platform and can be extended to limit the gross weight liftable by the platform.

This invention is not to be limited by the embodiment shown in the drawings and described in the description which is given by way of example and not of limitation, but only in accordance with the scope of the appended claims.

I claim:

1. In combination with a vehicle tailgate lift of the type which includes a platform that is adapted to be raised and lowered in a lifting mode while substantially level, and which, at its upper limit is adapted to be tilted to open and close in a folding mode, both by actuation of a hydraulic actuator comprising a piston-cylinder combination having a power chamber at one side of said piston and a supply port providing access to said power chamber, a sump, and a source of hydraulic fluid under pressure, the improvement comprising: a supply and control circuit for said hydraulic actuator comprising a supply conduit connecting said source to said supply port; a return conduit connecting said supply port to said sump; a first open-closed selector valve in said return concuit adapted selectively to enable and to prevent flow of hydraulic fluid from said supply port to said sump; a first relief valve having a relief pressure setting to relieve pressure in said supply conduit at its relief pressure, and discharging when exposed to fluid at or above said relief pressure, discharging said fluid to said sump; a second open-closed selector valve connected between said supply conduit and said first relief valve; said second selector valve being adapted selectively to enable and to prevent flow from said supply conduit to said first relief valve; and a selector for setting platform folding means, which platform folding means prevents or causes a platform folding mechanism to fold said platform upon actuation of said actuator while said platform is near or at its uppermost position, said selector being connected to said second selector valve whereby to enable passage of fluid from said supply conduit to said first relief valve when said platform is to be folded, whereby the folding of the platform with a weight in excess of the weight of the platform itself is prevented by said first relief valve.

2. Apparatus according to claim 1 in which a one way flow check valve is placed in said supply conduit downstream from the connection of said second selector valve to said supply conduit, and upstream from the connection of said first selector valve to said supply conduit.

3. Apparatus according to claim 2 in which control means is provided to enable the operation of said source to supply fluid under pressure.

4. Apparatus according to claim 2 in which said source is a hydraulic pump drawing fluid from said sump.

5. Apparatus according to claim 1 in which a second relief valve is connected to said supply conduit, having a relief pressure setting to relieve pressure in said supply conduit at its respective relief pressure, the relief setting of said second relief valve being higher than the relief setting of said first relief valve, whereby the weight of a load that can be lifted by said platform in the lifting mode is limited by the relief pressure setting of said second relief valve when the setting of the selector is such that the second selector valve is closed to flow.

6. Apparatus according to claim 5 in which a one way flow check valve is placed in said supply conduit downstream from the connection of said second selector valve and of said second selector valve to said supply conduit, and upstream from the connection of said first selector valve to said supply conduit.

7. Apparatus according to claim 6 in which control means is provided to enable the operation of said source to supply fluid under pressure.

8. Apparatus according to claim 6 in which said source is a hydraulic pump drawing fluid from said sump.

* * * * *